(12) United States Patent
Venkatachalapathy

(10) Patent No.: US 12,485,213 B2
(45) Date of Patent: Dec. 2, 2025

(54) AIR-POWERED PERITONEAL DIALYSIS SYSTEM WITH INFLATABLE BLADDERS

(71) Applicants: BAXTER INTERNATIONAL INC., Deerfield, IL (US); BAXTER HEALTHCARE SA, Glattpark (CH)

(72) Inventor: Narendar Venkatachalapathy, Karnataka (IN)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 479 days.

(21) Appl. No.: 18/020,199

(22) PCT Filed: Aug. 13, 2021

(86) PCT No.: PCT/US2021/045919
§ 371 (c)(1),
(2) Date: Feb. 7, 2023

(87) PCT Pub. No.: WO2022/040041
PCT Pub. Date: Feb. 24, 2022

(65) Prior Publication Data
US 2023/0302210 A1    Sep. 28, 2023

(30) Foreign Application Priority Data
Aug. 18, 2020 (IN) .............. 202041035526

(51) Int. Cl.
*A61M 1/28* (2006.01)
*A61M 1/14* (2006.01)
(Continued)

(52) U.S. Cl.
CPC .............. *A61M 1/28* (2013.01); *A61M 1/159* (2022.05); *A61M 1/281* (2014.02);
(Continued)

(58) Field of Classification Search
CPC ...... A61M 5/1483; A61M 5/159; A61M 5/28; A61M 5/281; A61M 5/445;
(Continued)

(56) References Cited

U.S. PATENT DOCUMENTS 5,720,728 A    2/1998   Dixon

FOREIGN PATENT DOCUMENTS

| CN | 107 837 432 | 3/2018 |
| DE | 27 21 552 | 3/1979 |

OTHER PUBLICATIONS

English translation Chinese Patent Application No. 107837432 A (2018).*

(Continued)

*Primary Examiner* — John Kim
(74) *Attorney, Agent, or Firm* — K&L Gates LLP

(57) ABSTRACT

A peritoneal dialysis system includes a cycler having one or more air pump; a slotted housing including a plurality of slots each having a first side and a second side, wherein each respective slot of the plurality of slots includes a first expandable bladder fixed to the first side, and wherein each respective slot of the plurality of slots is configured to receive a fluid supply bag between the first expandable bladder and the second side, and a heater housing sized to hold a second expandable bladder, and wherein the heater housing is configured to receive a fluid heater bag adjacent to the second expandable bladder, wherein the one or more air pump is in fluid communication with the respective first expandable bladders and the second expandable bladder; and a disposable set operable with the cycler.

20 Claims, 8 Drawing Sheets

(51) Int. Cl.
*A61M 5/148* (2006.01)
*A61M 5/44* (2006.01)
(52) U.S. Cl.
CPC .......... *A61M 5/1483* (2013.01); *A61M 5/445* (2013.01); *A61M 2205/07* (2013.01); *A61M 2205/3576* (2013.01); *A61M 2205/3653* (2013.01); *A61M 2205/50* (2013.01); *A61M 2205/52* (2013.01)
(58) Field of Classification Search
CPC ...... A61M 2205/07; A61M 2205/3576; A61M 2205/3653; A61M 2205/50; A61M 2205/52
See application file for complete search history.

(56) References Cited

OTHER PUBLICATIONS

International Search Report, PCT/US2021/045919 mailing date Nov. 22, 2021—3 pages.
Written Opinion, PCT/US2021/045919 mailing date Nov. 22, 2021—7 page.
International Preliminary Report on Patentability for International Patent Application No. PCT/US2021/045919, mailed Mar. 2, 2023, 9 pages.

* cited by examiner

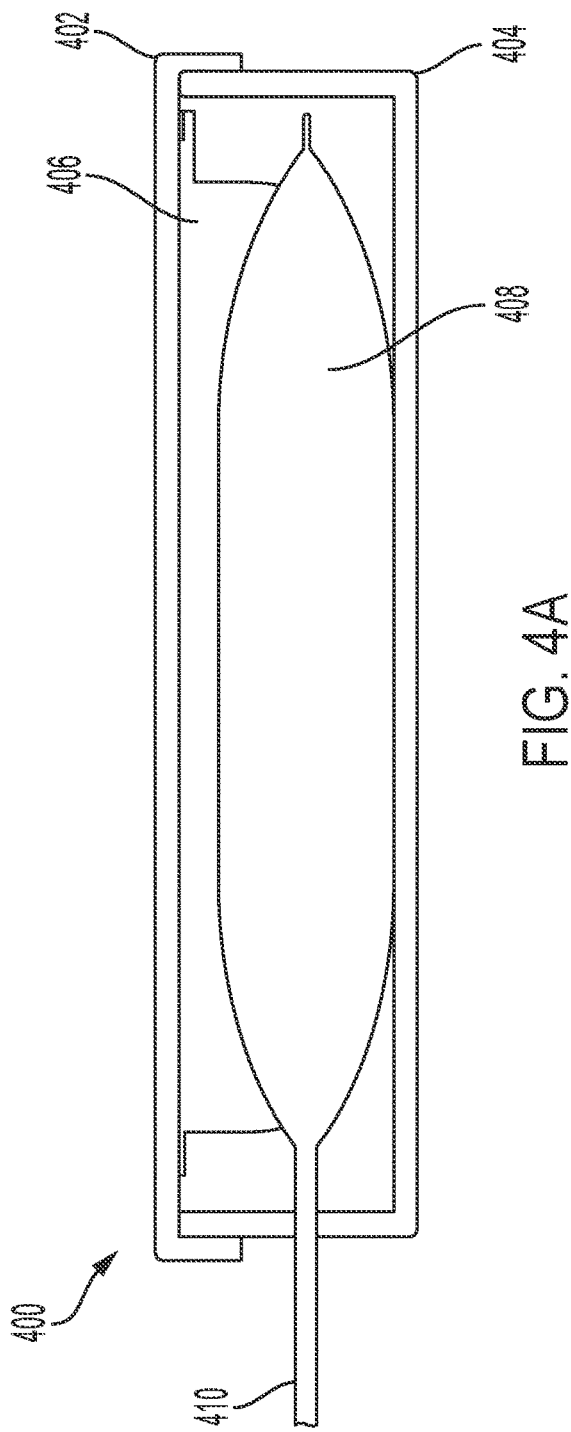
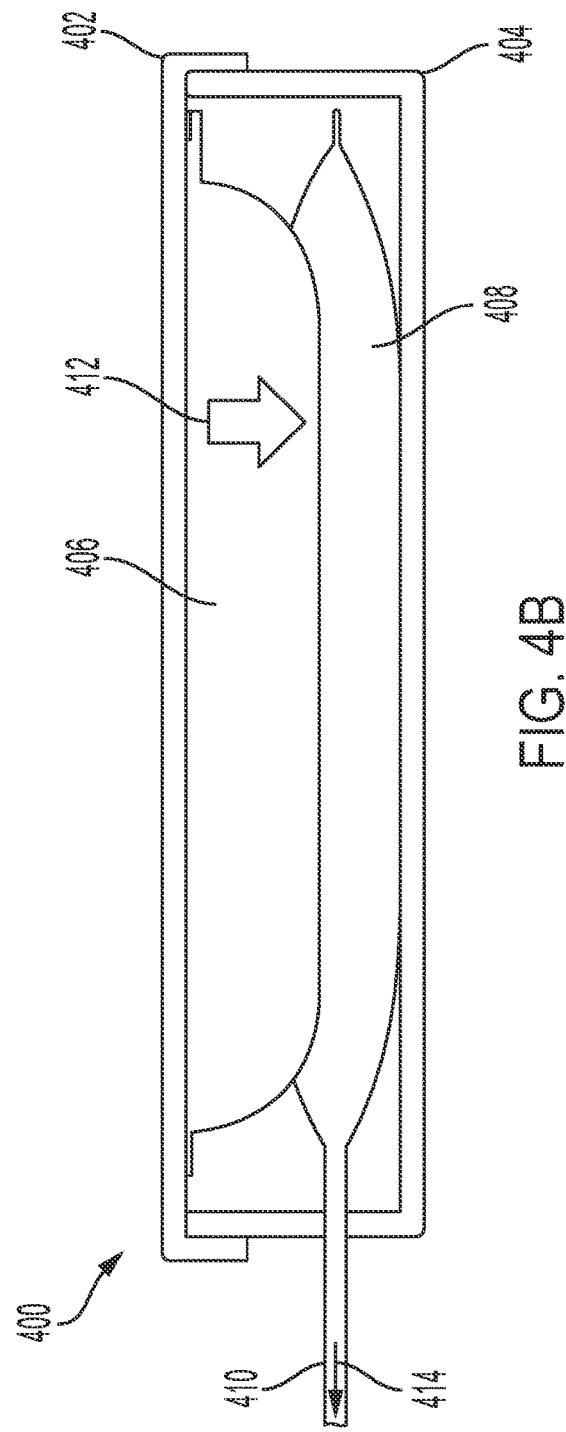
FIG. 4A
FIG. 4B

AIR-POWERED PERITONEAL DIALYSIS SYSTEM WITH INFLATABLE BLADDERS

PRIORITY CLAIM AND CROSS-REFERENCE TO RELATED APPLICATIONS

The present application is the National Stage filing under 35 U.S.C. § 371 of International Application No. PCT/US2021/045919, filed on Aug. 13, 2021, entitled "AIR-POWERED PERITONEAL DIALYSIS SYSTEM WITH INFLATABLE BLADDERS," which claims priority to and the benefit of Indian Provisional Application 20/204, 1035526, filed Aug. 18, 2020, the entirety of which is herein incorporated by reference.

TECHNICAL FIELD

The present disclosure relates generally to medical fluid treatments and in particular to dialysis fluid treatments.

BACKGROUND

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less intradialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Another type of kidney failure therapy is peritoneal dialysis ("PD"), which infuses a dialysis solution, also called dialysis fluid, into a patient's peritoneal chamber via a catheter. The dialysis fluid is in contact with the peritoneal membrane in the patient's peritoneal chamber. Waste, toxins and excess water pass from the patient's bloodstream, through the capillaries in the peritoneal membrane, and into the dialysis fluid due to diffusion and osmosis, i.e., an osmotic gradient occurs across the membrane. An osmotic agent in the PD dialysis fluid provides the osmotic gradient. Used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal flow dialysis and continuous flow peritoneal dialysis ("CFPD"). CAPD is a manual dialysis treatment. Here, the patient manually connects an implanted catheter to a drain to allow used or spent dialysis fluid to drain from the peritoneal chamber. The patient then switches fluid communication so that the patient catheter communicates with a bag of fresh dialysis fluid to infuse the fresh dialysis fluid through the catheter and into the patient. The patient disconnects the catheter from the fresh dialysis fluid bag and allows the dialysis fluid to dwell within the peritoneal chamber, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

Automated peritoneal dialysis ("APD") is similar to CAPD in that the dialysis treatment includes drain, fill and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to a source or bag of fresh dialysis fluid and to a fluid drain. APD machines pump fresh dialysis fluid from a dialysis fluid source, through the catheter and into the patient's peritoneal chamber. APD machines also allow for the dialysis fluid to dwell within the chamber and for the transfer of waste, toxins and excess water to take place. The source may include multiple liters of dialysis fluid including several solution bags.

APD machines pump used or spent dialysate from the peritoneal chamber, though the catheter, and to the drain. As with the manual process, several drain, fill and dwell cycles occur during dialysis. A "last fill" may occur at the end of the APD treatment. The last fill fluid may remain in the peritoneal chamber of the patient until the start of the next treatment, or may be manually emptied at some point during the day.

In any of the above modalities using an automated machine, the automated machine operates typically with a cycler programmed to control how a cassette pumps fluid between bags and to a patient. Programming the cycler to control the cassette's fluid pumping typically requires a complex logic circuit and complex pneumatic mechanisms. This complexity accordingly increases the costs associated with the cycler. Additionally, the cassette is typically part of a disposable set, which is discarded after a single use. Depending upon the complexity of the disposable set, the cost of using one set per day may become significant.

For each of the above reasons, it is desirable to provide a relatively simple APD machine, which operates a simple and cost effective disposable set.

SUMMARY

The present disclosure relates to an automated peritoneal dialysis ("APD") machine or cycler that controls fluid flow by way of inflating expandable bladders with air. The APD machine or cycler includes containers with expandable bladders that are inflated with air from an air pump to drive fluid from fluid bags placed in the containers. In one embodiment, the containers include a slotted housing and a heater housing. The slotted housing includes individual slots (e.g., three slots) that each have an expandable bladder fixed to one of the slot walls. Each slot is sized such that a bag or container filled with fluid can be positioned in the slot, between the expandable bladder and the opposite wall of the slot. As the expandable bladder is inflated with air, the bladder and the opposite wall apply a compressive force to the fluid-filled bag or container to drive fluid out of the bag or container. Each slot's expandable bladder is inflated independently of the other bladders. In an embodiment, a single air pump individually inflates each bladder. In other embodiments, the APD machine or cycler may include more than one air pump, such as an air pump dedicated for each bladder. The one or more air pump may include separate component(s) or may be integrated with the slotted housing or the heater housing.

The heater housing in one embodiment may include a compartment for a bag or container filled with fluid, and a lid that closes over the compartment. The lid has an expandable bladder fixed to the lid's interior. The heater housing may also include a heater for heating the fluid in the bag or container positioned in the compartment. When the lid is closed, and the expandable bladder is inflated with air, the bladder and a compartment wall apply a compressive force to the fluid-filled bag or container to drive heated fluid out of the bag or container. In an embodiment, the heater housing's expandable bladder may be inflated by the same air pump as the slotted housing's expandable bladders. In an alternative embodiment, the heater housing's expandable bladder may be inflated by a separate air pump. In such an alternative embodiment, the separate air pump may be a separate component or may be integrated with the slotted housing or the heater housing.

The APD machine or cycler may be used with a disposable set for conducting drain, fill and dwell cycles of dialysis fluid to and from a patient. The disposable set may include fluid supply bags and supply lines connected to each of the fluid supply bags. One of the fluid supply bags is a last fill bag in one embodiment. In an embodiment, the fluid supply bags are positioned within the slots in the slotted housing. The disposable set may also include a heater bag connected to a heater line. In an embodiment, the heater bag is positioned within the heater housing. The disposable set may also include a drain bag connected to a drain line, and may also include a patient line for delivering fluid to and draining fluid from a patient. In one embodiment, the APD machine or cycler may also include a peristaltic pump in fluid communication with the drain line to drive fluid to the drain bag during a drain sequence. Each of the lines may be in fluid communication with one another, for instance, by way of a disposable connector.

In an embodiment, the APD machine or cycler includes a set of clamps or valves, such as electrically actuated solenoid clamps or valves, motorized pinch valves or pneumatically actuated clamps or valves, for directing fluid flow between the fluid bags and to and from the patient. The supply lines, heater line, drain line, and/or patient line may each be positioned within a clamp or valve such that when a respective clamp or valve is closed, fluid cannot flow through the line past the closed clamp or valve. The APD machine or cycler may also include a control unit programmed to control the air pump(s) and the clamps or valves to direct fluid flow from the fluid supply bags, heater bag and the patient during a drain, fill and dwell sequence. For instance, the APD machine or cycler directs fluid flow by directing air flow to drive fluid out of the fluid-filled bags in the disposable set.

In one example sequence, the control unit is programmed to first execute a drain cycle. The clamps on the supply lines and the heater line are closed while the clamps on the drain line and patient line are opened. The peristaltic pump is then activated to drive fluid from the patient into the drain bag. After the drain is complete, the clamps on the drain line and patient line are closed. The clamp on one of the supply lines and the clamp on the heater line are then opened to begin a heating operation. An air pump is then activated to inflate, in a controlled manner, the bladder of the slot containing the fluid supply bag connected to the supply line with the opened clamp. As the bladder inflates, it forces fluid out of the fluid supply bag, through the supply line and the heater line, and into the heater bag in the heater housing.

Once all the fluid from the fluid supply bag is transferred to the heater bag, the clamp on the supply line is closed and the heater housing heats the fluid in the heater bag. The clamp on the heater line may also be closed. The heating operation may be performed simultaneously with the directly preceding drain cycle. After heating is complete, the clamp on the heater line, if closed, is opened, while the clamp on the patient line is opened and an air pump is activated to inflate, in a controlled manner, the heater housing bladder. As the bladder inflates, it forces the heated fluid out of the heater bag, through the heater line and patient line, into the patient. This example sequence is then be repeated for each of the fluid supply bags in the slotted housing following a preceding dwell phase and drain phase.

It should be appreciated that because the air-inflated bladders drive fluid flow, the need for a cassette having a hard pumping portion is eliminated, reducing the cost of a disposable set. The provided APD machine or cycler additionally eliminates the complex pneumatic mechanism and complex logic present in typical APD machines or cyclers for pumping fluid with a cassette. Eliminating this complex pneumatic mechanism and complex logic reduces the complexity and cost of the present APD machine.

In light of the disclosure set forth herein, and without limiting the disclosure in any way, a peritoneal dialysis system includes: a cycler; and a disposable set operable with the cycler, the cycler including one or more air pump; a slotted housing including a plurality of slots each having a first side and a second side, wherein each respective slot of the plurality of slots includes a first expandable bladder fixed to the first side, and wherein each respective slot of the plurality of slots is configured to receive a fluid supply bag between the first expandable bladder and the second side, and a heater housing sized to hold a second expandable bladder, and wherein the heater housing is configured to receive a fluid heater bag adjacent to the second expandable bladder, wherein the one or more air pump is in fluid communication with the respective first expandable bladders and the second expandable bladder.

In a second aspect, which may be used with any other aspect described herein, the peritoneal dialysis system is configured such that each respective first expandable bladder, and the second expandable bladder, is inflatable with air from the one or more air pump independently of the other bladders.

In a third aspect, which may be used with any other aspect described herein, the peritoneal dialysis system is configured such that inflating a respective first expandable bladder in a respective slot with air drives fluid out of a respective fluid supply bag positioned in the respective slot.

In a fourth aspect, which may be used with any other aspect described herein, the peritoneal dialysis system is configured such that inflating the second expandable bladder with air drives fluid out of the fluid heater bag positioned in the compartment of the heater housing.

In a fifth aspect, which may be used with any other aspect described herein, the one or more air pump is provided with at least one of the slotted housing or the heater housing.

In a sixth aspect, which may be used with any other aspect described herein, a rate of fluid flow from each of the fluid supply bags is dependent on a rate of air flow from the one or more air pump.

In a seventh aspect, which may be used with any other aspect described herein, the disposable set includes the fluid supply bags, the heater fluid bag, a drain bag, a respective supply line fluidly connected to each respective fluid supply bag, a heater line fluidly connected to the heater fluid bag, and a drain line fluidly connected to the drain bag.

In an eighth aspect, which may be used with any other aspect described herein, the drain bag includes an outer bag in fluid communication with the one or more air pump; and an inner bag in fluid communication with the drain line, the inner bag positioned within the outer bag, wherein the outer bag is connected to the inner bag such that expansion of the outer bag causes expansion of the inner bag.

In a ninth aspect, which may be used with any other aspect described herein, the peritoneal dialysis system includes a drain pump positioned and arranged to pump used dialysis fluid to the drain bag.

In a tenth aspect, which may be used with any other aspect described herein, the cycler further includes at least one valve, and wherein at least one of the supply line, heater line or drain line is selectively occluded by the at least one valve.

In an eleventh aspect, which may be used with any other aspect described herein, the slotted housing and the heater housing are provided in a same enclosure.

In a twelfth aspect, which may be used with any other aspect described herein, a peritoneal dialysis system includes: a cycler; and a disposable set operable with the cycler, the cycler including one or more air pump, a slotted housing including a plurality of slots each having a first side and a second side, wherein each respective slot of the plurality of slots includes a first expandable bladder fixed to the first side, and wherein each respective slot of the plurality of slots is configured to receive a fluid supply bag between the first expandable bladder the second side, a heater housing sized to hold a second expandable bladder, and wherein the heater housing is configured to receive a fluid heater bag adjacent to the second expandable bladder, and at least one valve, wherein the one or more air pump is in fluid communication with the first expandable bladder and the second expandable bladder, the disposable set including the fluid supply bags positioned in the slots, the fluid heater bag positioned in the compartment, a drain bag, a supply line fluidly connected to each respective fluid supply bag, a heater line fluidly connected to the heater fluid bag, a drain line fluidly connected to the drain bag, and a patient line, wherein at least one of the supply lines, the heater line or the drain line is selectively occluded via the at least one valve.

In a thirteenth aspect, which may be used with any other aspect described herein, the cycler further includes a drain line pump configured to pump used dialysis fluid to flow to the drain bag; and a control unit programmed to cause: supply line and heater line valves to close, the drain line pump to be actuated, a drain line valve to close, a first supply line valve for a first fluid supply bag positioned in a first slot to open, a heater line valve to open, the one or more air pump to be actuated to inflate the first expandable bladder positioned in the first slot, the first supply line to close, and the one or more air pump to be actuated to inflate the second expandable bladder.

In a fourteenth aspect, which may be used with any other aspect described herein, the drain bag includes: an outer bag in fluid communication with the one or more air pump; and an inner bag in fluid communication with the drain line, the inner bag positioned within the outer bag, wherein the outer bag is connected to the inner bag such that expansion of the outer bag causes expansion of the inner bag, and the control unit is further programmed to cause, prior to causing the drain line valve to close, the one or more air pump to be actuated to inflate the outer bag.

In a fifteenth aspect, which may be used with any other aspect described herein, the control unit is further programmed to cause: the heater line valve to close; the drain line valve to open; the drain line pump to be actuated; the drain line valve to close; a second supply line valve for a second fluid supply bag positioned in a second slot to open; the heater line valve to open; the one or more air pump to be actuated to inflate the first expandable bladder positioned in the second slot; the second supply line valve to close; and the one or more air pump to be actuated to inflate the second expandable bladder.

In a sixteenth aspect, which may be used with any other aspect described herein, a peritoneal dialysis cycler includes one or more air pump; a slotted housing including a plurality of slots each having a first side and a second side, wherein each respective slot of the plurality of slots includes a first expandable bladder fixed to the first side, and wherein each respective slot of the plurality of slots is configured to receive a fluid supply bag between the first expandable bladder and the second side; and a heater housing including a compartment sized to hold a second expandable bladder, wherein the heater housing is configured to receive a fluid heater bag adjacent to the second expandable bladder, and wherein the one or more air pump is in fluid communication with the first expandable bladders and the second expandable bladder.

In a seventeenth aspect, which may be used with any other aspect described herein, the slotted housing is configured such that each first expandable bladder may inflate to contact the second side of its respective slot.

In an eighteenth aspect, which may be used with any other aspect described herein, the heater housing includes a heater to supply heat to fluid in the fluid heater bag positioned within the compartment.

In a nineteenth aspect, which may be used with any other aspect described herein, the slotted housing and the heater housing are provided in a same enclosure.

In a twentieth aspect, which may be used with any other aspect described herein, the heater housing is thermally insulated.

In a twenty-first aspect, any of the features, functionality and alternatives described in connection with any one or more of FIGS. 1 to 6B may be combined with any of the features, functionality and alternatives described in connection with any other of FIGS. 1 to 6B.

It is accordingly an advantage of the present disclosure to provide an APD cycler that uses both a low cost and simple cycler and a low cost and simple disposable.

It is another advantage of the present disclosure to provide an APD cycler that eliminates the need for a rigid cassette.

It is a further advantage of the present disclosure to provide an APD cycler that eliminates a complex pneumatic mechanism for pumping fluid using a rigid pumping cassette.

It is still another advantage of the present disclosure to provide an APD cycler that eliminates complex logic circuit associated with a rigid pumping cassette.

It is yet another advantage of the present disclosure to provide an APD cycler that simplifies a logic circuit required to move fluid between fluid bags and to and from the patient.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE DRAWINGS

FIG. 4A illustrates a cross-sectional side view of an example heater housing showing a bladder in a deflated condition, according to an aspect of the present disclosure.

FIG. 4B illustrates a cross-sectional side view of an example heater housing showing an inflated bladder forcing fluid from a heater bag, according to an aspect of the present disclosure.

DETAILED DESCRIPTION

Figure 1:
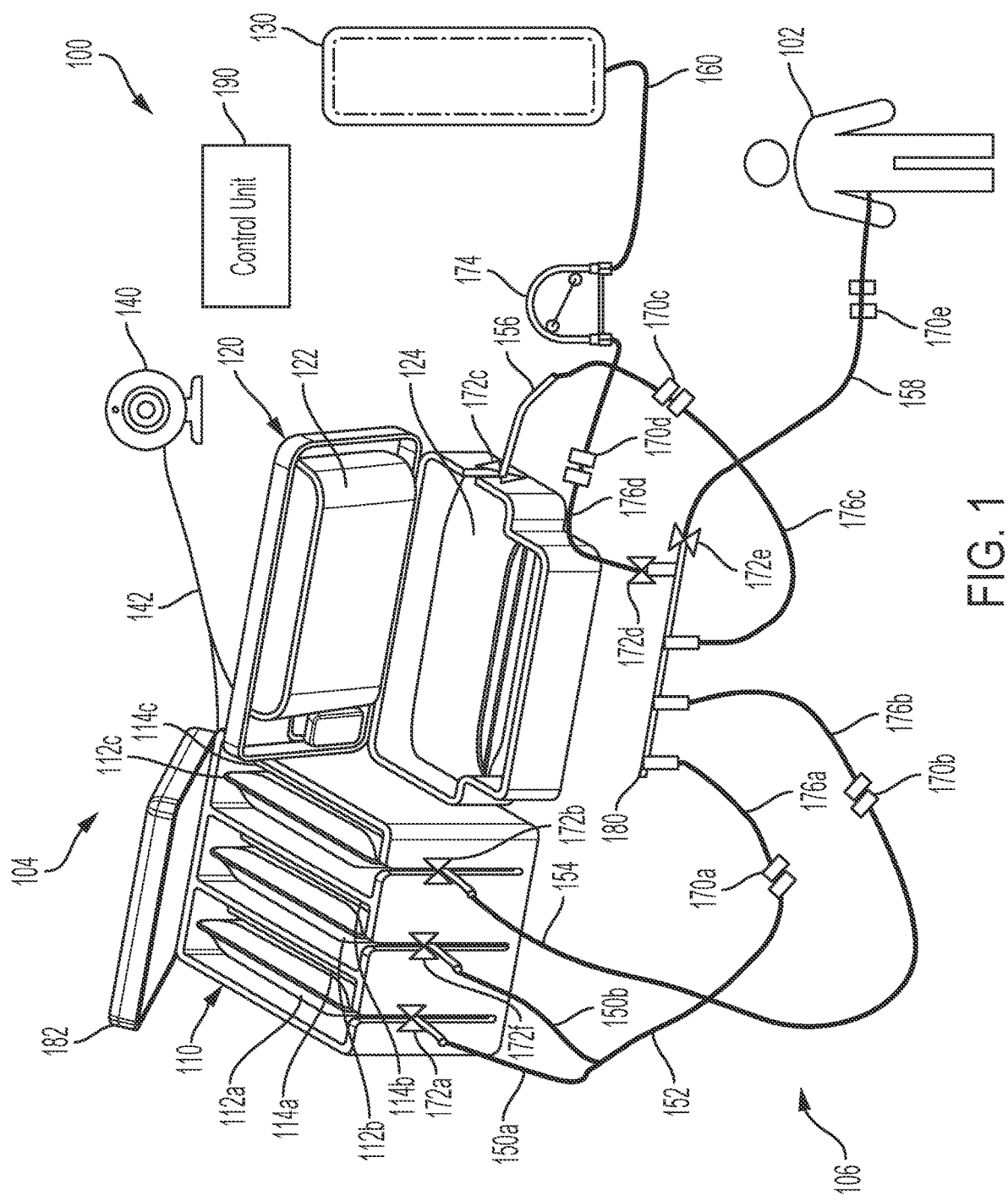
FIG. 1 illustrates an example peritoneal dialysis system of the present disclosure.

Referring now to the drawings and in particular to FIG. 1, a peritoneal dialysis ("PD") system 100 includes a PD machine or cycler 104 that operates with a disposable set 106. In various embodiments, the PD machine or cycler 104 includes a slotted housing 110, a heater housing 120 and one or more air pump 140. The slotted housing 110 includes multiple slots that each include a respective bladder 114a, 114b, 114c that is expandable. In some embodiments, the slotted housing 110 may include a lid 182 that covers the slots during operation, e.g., in a sealed manner. Slotted housing 110 is explained in more detail in connection with FIGS. 2A and 2B below. Heater housing 120 includes a compartment and a lid that encloses the compartment, e.g., in a sealed manner. A bladder 122 that is expandable is fixed to the interior of the lid of heater housing 120. Heater housing 120 is explained in more detail in connection with FIGS. 3A, 3B, 4A and 4B below.

In other embodiments, slotted housing 110 and heater housing 120 may be combined in a single enclosure. In such embodiments, the single enclosure may include individual chambers corresponding to the slots of the slotted housing 110 and the compartment of the heater housing 120. The single enclosure may include each of the features described in connection with the separate slotted housing 110 and heater housing 120. For example, the heater housing 120 is described herein as including a heater. The single enclosure also includes a heater. The heater in the single enclosure may heat all of the fluid bags at once or heat each individual chamber separately. It should also be appreciated that the fluid lines and clamps or valves may be arranged for the single enclosure.

One or more air pump 140 is pneumatically connected so as to selectively inflate any one or more or each of bladder 114a, 114b, 114c and/or bladder 122 in a controlled manner. One or more air pump 140 is illustrated in FIG. 1 as a separate component for the sake of clarity, however in various embodiments the air pump may be integrated with the slotted housing 110 and/or the heater housing 120. In at least one embodiment, the one or more air pump 140 may be a single air pump that is pneumatically connected to each of the respective bladders 114a, 114b, 114c in the slotted housing 110 and to the bladder 122 in the heater housing 120 via an air line 142. For instance, air line 142 may be a manifold line that splits into separate lines, each of which leads to a respective bladder 114a, 114b, 114c or bladder 122. In such an embodiment, the PD machine or cycler 104 includes one or more valves or clamps to direct air from the air pump 140 to a particular bladder 114a, 114b, 114c or bladder 122. For example, the one or more valves or clamps may be electrically actuated pneumatic solenoid valves or clamps or pneumatically actuated valves or clamps.

In other embodiments, one or more air pump 140 includes multiple or separate air pumps. For instance, the PD machine or cycler 104 may include a first air pump 140 dedicated to and located in slotted housing 110 and a second air pump 140 dedicated to and located in heater housing 120. In such instances, first air pump 140 may include one or more valves or clamps to direct air from the first air pump 140 to a respective bladder 114a, 114b, 114c provided in a particular slot. In another embodiment, each respective bladder 114a, 114b, 114c in the slotted housing 110 may have its own air pump 140. In any of the embodiments described herein, one or more air pump 140 may be a separate component(s) that is external to the slotted housing 110 and/or the heater housing 120, or may be integrated with the slotted housing 110 and/or the heater housing 120. For example, the one or more air pump 140 may be integrated within the bottom of the slotted housing 110 and/or the heater housing 120. In instances in which a single air pump 140 is integrated within a bottom of one of the housings (e.g., the slotted housing 110), a pneumatic tube may connect the other housing (e.g., heater housing 120) to the single air pump 140. The one or more air pump 140 may be housed (e.g., within a damping cabinet) to reduce external noise caused by the one or more air pump 140 when in operation.

The disposable set 106 of the PD system 100 may include multiple fresh dialysis fluid supply bags 112a, 112b, 112c (e.g., two or three or more bags). Each of fluid supply bags 112a, 112b, 112c may be filled with the same or different fresh dialysis fluid and be positioned within respective slots of the slotted housing 110. The volume of fluid in supply bags 112a, 112b, 112c in the disposable set 106 may depend on the quantity of slots in the slotted housing 110. In some embodiments, one of the fluid supply bags 112a, 112b, 112c may be a premixed last fill bag of a specially formulated dialysis fluid. The disposable set 106 also includes supply lines 150a, 150b, 152 and 154. The supply line 150a extends from fluid supply bag 112a, converges into fluid line 152, and terminates at supply line connector 170a. The supply line 150b extends from fluid supply bag 112b, converges into fluid line 152, and terminates at supply line connector 170a. The supply line 154 extends from fluid supply bag 112c and terminates at supply line connector 170b. In the illustrated example, the fluid supply bags 112a and 112b may each be a supply bag for separate fill and dwell sequences, whereas fluid supply bag 112c may be a last fluid bag having a different dialysis fluid. The supply lines 150a and 150b may therefore converge into supply line 152, e.g., via a "Y" or "T" connector, while supply line 154 remains separate. In other examples, however, the supply line 150a and supply line 150b each extend to its own connector instead of converging into a single line 152.

The disposable set 106 of the PD system 100 also includes a heater bag 124. The heater bag 124 may be filled with dialysis fluid and positioned within the compartment of the heater housing 120. The disposable set 106 also includes a heater line 156 that extends from the heater bag 124 and terminates at a heater line connector 170c. The disposable set 106 further includes a drain bag 130. The drain bag 130 may collect fluid drained from a patient 102. The disposable set 106 additionally includes a drain line 160 that extends from drain bag 130 and terminates at a drain line connector 170d. In the illustrated embodiment, PD system 100 includes a pump 174, such as a peristaltic, membrane or gear pump, that is placed in operable communication with drain line 160 for pulling used dialysis fluid of effluent from patient 102 into drain bag 130.

The disposable set 106 is configured such that supply lines 150a, 150b, 152 and 154, heater line 156, drain line 160, and a patient line 158 are in fluid communication with one another. For example, an organizing manifold 180 may be provided and include connecting tubes and line connectors to fluidly connect and organize each of the lines extending therefrom. Organizing manifold 180 may include a supply connecting tube 176a terminating at supply line connector 170a, and a supply connecting tube 176b terminating at supply line connector 170b. In certain embodiments, organizing manifold 180 includes an additional supply connecting tube and supply line connector for instances in which supply line 150a and supply line 150b do not converge. Organizing manifold 180 may also include a heater connecting a tube 176c that terminates at heater line connector 170c. Organizing manifold 180 may further include a drain connecting tube 176d terminating at drain line connector 170d. The organizing manifold 180 may additionally include patient line 158 terminating at a patient line connector 170e.

All components of the disposable set 106, including all fluid lines, fluid bags or containers and fluid line connectors may be made of any one or more plastic, such as, polyvinyl chloride ("PVC"), polyethylene ("PE") or polyurethane ("PU"), or other suitable non-PVC polymer.

PD system 100 also includes a set of clamps or valves to control fluid flow through the lines. The clamps or valves may be positioned on the fluid lines or connecting tubes or may be an integrated component of slotted housing 110 and/or heater housing 120. For example, clamps or valves 172a, 172b and 172f may be components of slotted housing 110 and are each positioned at a respective slot from which the respective supply lines 150a, 150b and 154 exit slotted housing 110. Clamp or valve 172c may be a component of heater housing 120 and may be positioned at the opening from which heater line 156 exits the heater housing 120. In other examples, clamp or valve 172a, 172b and/or 172f may be fixed to the interior of the slotted housing 110 and/or clamp or valve 172c may be fixed to the interior of the heater housing 120. Clamps or valves 172d and 172e are connected to the organizing manifold 180 so that fluid flow to drain bag 130 and to patient 102 may be controlled.

In various embodiments, clamps or valves 172a, 172b, 172c, 172d, 172e, 172f and 172f may be electrically actuated solenoid valves or clamps or pneumatically actuated valves or clamps. In one embodiment, clamps or valves 172a, 172b, 172c, 172d, 172e, 172f and/or 172f are electrically actuated valves, such as solenoid valves or variable orifice valves. In another embodiment, clamps or valves 172a, 172b, 172c, 172d, 172e, 172f and/or 172f are clamps that are manually opened and closed. In some embodiments, a portion of clamps or valves 172a, 172b, 172c, 172d, 172e, 172f and 172f are manually operated clamps while a remaining portion are electrically actuated valves. When in an open position, clamp or valve 172a, 172b, 172c, 172d, 172e or 172f enables dialysis fluid to flow through a fluid line or connecting tube. When in a closed position, clamp or valve 172a, 172b, 172c, 172d or 172e prevents dialysis fluid from flowing through a fluid line or connecting tube past the closed clamp 172a, 172b, 172c, 172d, 172e or 172f.

In various embodiments, the PD machine or cycler 104 of PD system 100 includes control unit 190 that is communicatively coupled to the components discussed herein, e.g., wired or wirelessly. For instance, the control unit 190 is programmed to control clamps or valves 172a, 172b, 172c, 172d, 172e, 172f and 172f, one or more air pump 140 and pump 174 to direct fluid flow in PD system 100. Clamps or valves 172a, 172b, 172c, 172d, 172e and 172f may be under control of control unit 190 to control where fluid flows, while air pump 140 and drain pump 174 may be under control of control unit 190 to control the speed and pressure of fluid flow. Pressure sensors may be provided to operate with patient line 158 so as to provide feedback to control unit 190 to limit positive and negative pressure to the patient to be within a safe limit.

Control unit 190 includes at least one processor and at least one memory in communication with the at least one processor. Control unit 190 may be stored in its own housing, may be integrated with one or more air pump 140, or may be integrated with slotted housing 110 or heater housing 120. Control unit 190 may, in some instances, command (e.g., wired or wirelessly) a delegate control unit of one of the components of the PD machine or cycler 104. For example, in instances in which control unit 190 is integrated with slotted housing 110, heater housing 120 may include a delegate control unit that is commanded by control unit 190. Control unit 190, in some instances, also includes a wired or wireless transceiver for sending information to and receiving information from an external device. Wired communication may be via Ethernet connection, for example. Wireless communication may be performed via any of Bluetooth™ WiFi™, Zigbee®, Z-Wave®, wireless Universal Serial Bus ("USB"), or infrared protocols, or via any other suitable wireless communication technology. Example programming logic stored in the memory of control unit 190 and executed by the processor of control unit 190 will be discussed in more detail below.

PD machine or cycler 104 may also include a user interface (not illustrated). For example, the user interface may be integrated with lid 182 of slotted housing 110 or with the lid of heater housing 120. Control unit 190 in an embodiment includes a video controller, which may have its own processing and memory for interacting with primary control processing and memory of control unit 190. The user interface may include a video monitor, which may operate with a touch screen overlay placed onto the video monitor for inputting commands via the user interface into control unit 190. The user interface may also include one or more electromechanical input device, such as a membrane switch or other button. Control unit 190 may further include an audio controller for playing sound files, such as voice activation commands, at one or more speaker of the user interface.

Figure 2A:
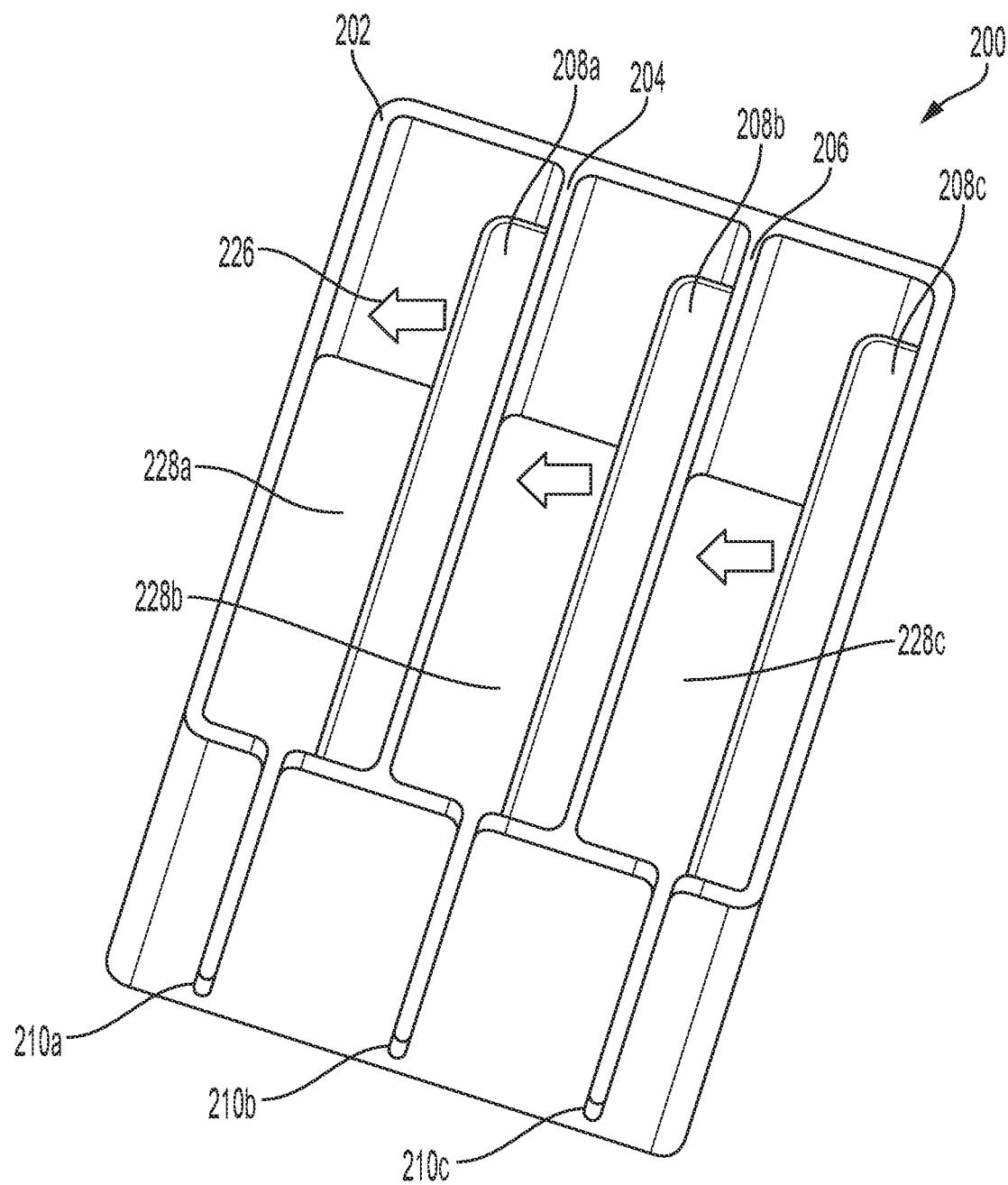
FIGS. 2A and 2B illustrate an example empty and filled slotted housing, respectively, according to an aspect of the present disclosure.
Figure 2B:
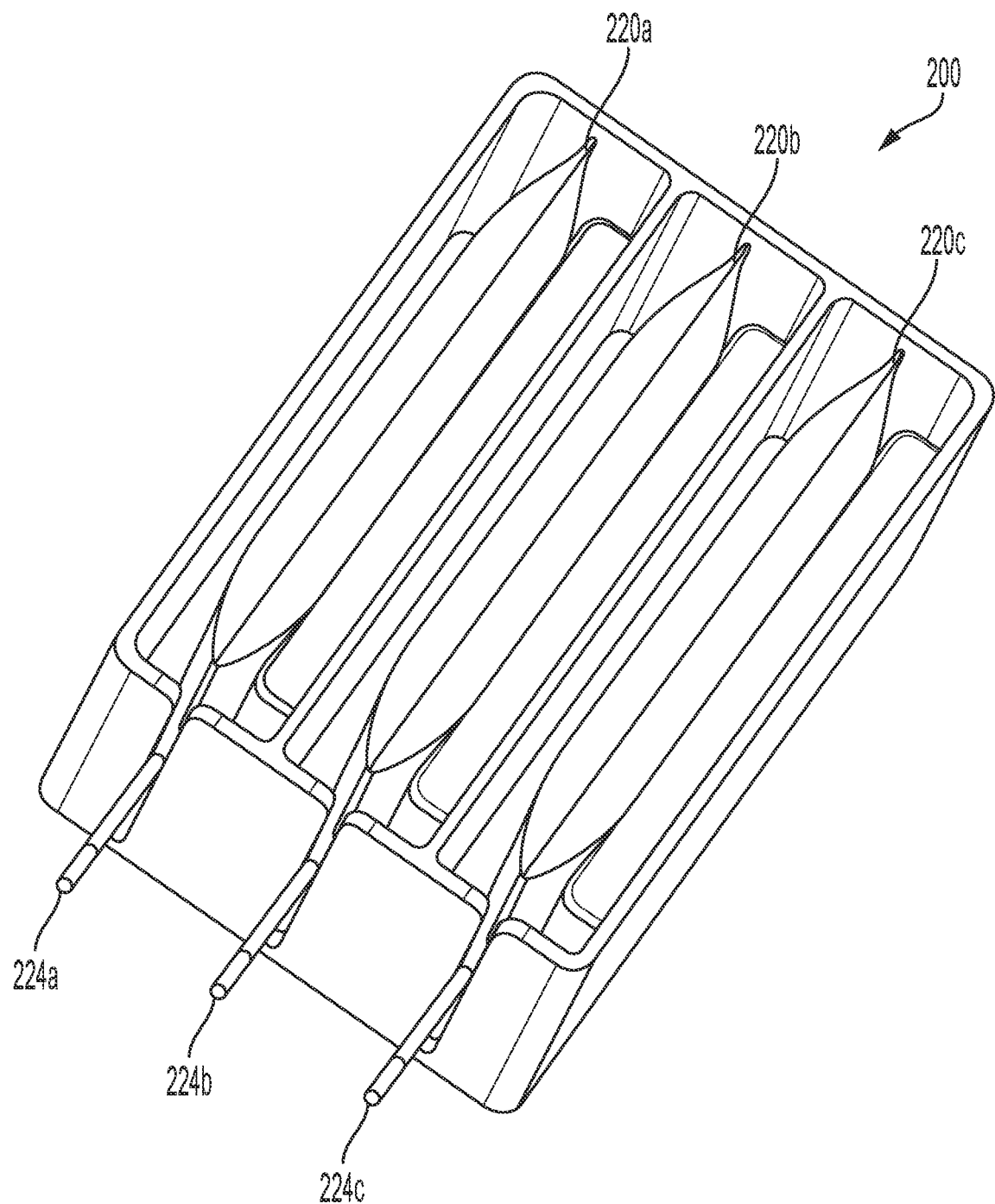

FIGS. 2A and 2B illustrate an example empty and filled slotted housing 200, respectively. Slotted housing 200 includes a housing 202. Housing 202 and its dividers may be constructed of one or more plastic, such as, polyvinyl chloride ("PVC"), polyethylene ("PE") or polyurethane ("PU"), or other suitable non-PVC polymer. Housing 202 and its dividers may additionally or alternatively be constructed of a metal, metal alloy, e.g., aluminum, steel or stainless steel, or other suitably sturdy material capable of withstanding the exerted forces described in the present disclosure. Housing 202 includes one or more divider separating individual slots. For example, housing 202 of example slotted housing 200 includes a divider 204 and a divider 206 separating the slots 228a, 228b and 228c. In other examples, housing 202 may have only a single divider forming two slots, or may have more than two dividers forming more than three slots.

Housing 202 may also include an opening for each respective slot. For example, housing 202 includes opening 210a for slot 228a, opening 210b for slot 228b and opening 210c for slot 228c. Openings 210a, 210b, 210c enable a fluid bag or container positioned within a slot 228a, 228b, 228c to extend outside of slotted housing 200 in order to be connected to the respective lines of the disposable set 106 described above. The openings 210a, 210b, 210c may include clamps or valves attached to control fluid movement, as described above. Slotted housing 200, in some embodiments, includes a lid (not illustrated) attached to housing 202 that can be closed to cover the tops of slots 228a, 228b and 228c (e.g., as depicted in FIG. 1).

Slotted housing 200 also includes an expandable bladder within each respective slot. For example, slotted housing 200 includes bladder 208a within slot 228a, bladder 208b within slot 228b and bladder 208c within slot 228c. Each bladder 208a, 208b, 208c is attached to a first side of respective slots 228a, 228b, 228c and is capable of expanding (e.g., as it is inflated with air) towards the opposite side of respective slots 228a, 228b, 228c in the direction of arrow 226. In various embodiments, bladders 208a, 208b and 208c are capable of expanding all the way to the opposite side of respective slots 228a, 228b, 228c. Bladders 208a, 208b and 208c may be constructed of rubber, e.g., silicone rubber, PVC-type flexible plastic material, or other material of suitable strength and flexibility to repeatedly expand and contract over many cycles and over multiple treatments (bladders are reusable in one embodiment).

In some instances, bladders 208a, 208b and 208c may be fixedly attached to the respective first sides of slots 228a, 228b, 228c, for example, by adhesive. In some instances, bladders 208a, 208b and 208c may be fixed by fastening clamps or fasteners (e.g., when the slots are made of plates inserted into the housing). In other instances, bladders 208a, 208b and 208c may be removably attached to the respective first sides of slots 228a, 228b, 228c, for example, by hook and loop fasteners (e.g., Velcro®), snap components, hanging on hooks, or other suitable temporary attachment mechanisms. Bladders 208a, 208b and 208c may have attachment flanges for the purpose of attachment. Removably attaching bladders 208a, 208b and 208c to respective first sides of slots 228a, 228b, 228c may enable easier maintenance of slotted housing 200. For example, if a single bladder 208a, 208b, 208c ruptures, the ruptured bladder 208a, 208b, 208c may be easily replaced without replacing any other components of slotted housing 200.

As described above, each respective bladder 208a, 208b, 208c is connected to an air pump that supplies air to individually inflate respective bladders 208a, 208b and 208c. In some embodiments, the connection to the air pump may be external to housing 202 through an opening in housing 202. In other embodiments, the connection to the air pump may be interior to housing 202. For example, the connection to the air pump may be integrated into the respective first sides of slots 228a, 228b, 228c to which bladders 208a, 208b and 208c are attached.

Slotted housing 200 is configured such that a bag or container filled with fluid may be positioned within each slot 228a, 228b, 228c between a respective bladder 208a, 208b, 208c and an opposing wall. For example, FIG. 2B illustrates slotted housing 200 filled with fluid bags or containers 220a, 220b and 220c. Each fluid bag or container 220a, 220b and 220c includes a respective fluid outlet 224a, 224b, 224c. Fluid outlets 224a, 224b, and 224c are illustrated positioned within and through openings 210a, 210b and 210c. Accordingly, as a bladder (e.g., bladder 208a) is inflated with air and expands outward, the bladder and opposite wall of the bladder's slot (e.g., slot 228a) apply compressive force to a fluid bag or container (e.g., fluid bag or container 220a) positioned within the slot to drive fluid out of the fluid bag or container and through the fluid outlet (e.g., fluid outlet 224a). Fluid outlets 224a, 224b, and 224c may be connected to the fluid lines as described above in connection with FIG. 1.

Figure 3A:
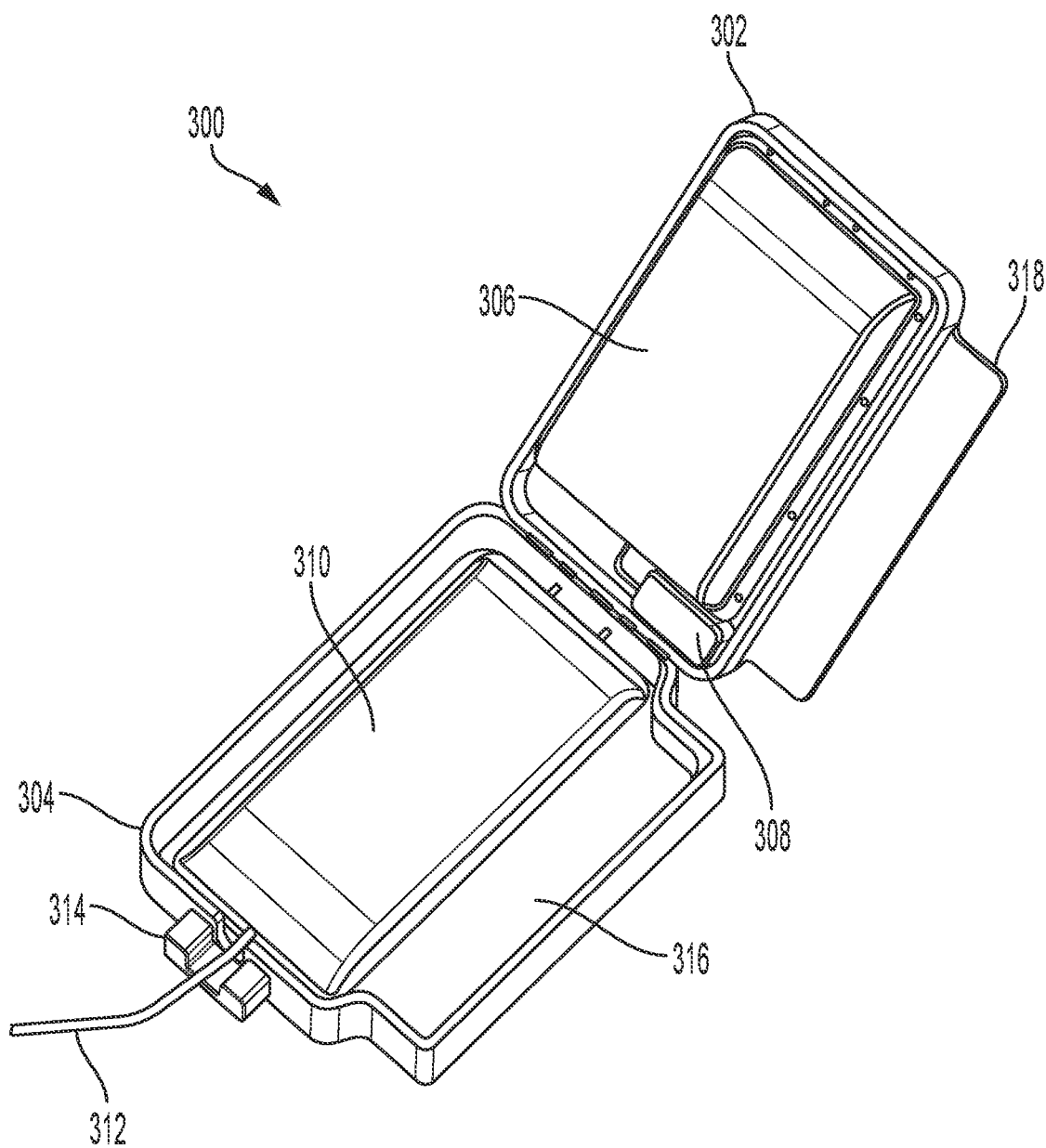
FIGS. 3A and 3B illustrate an example heater housing, according to an aspect of the present disclosure.
Figure 3B:
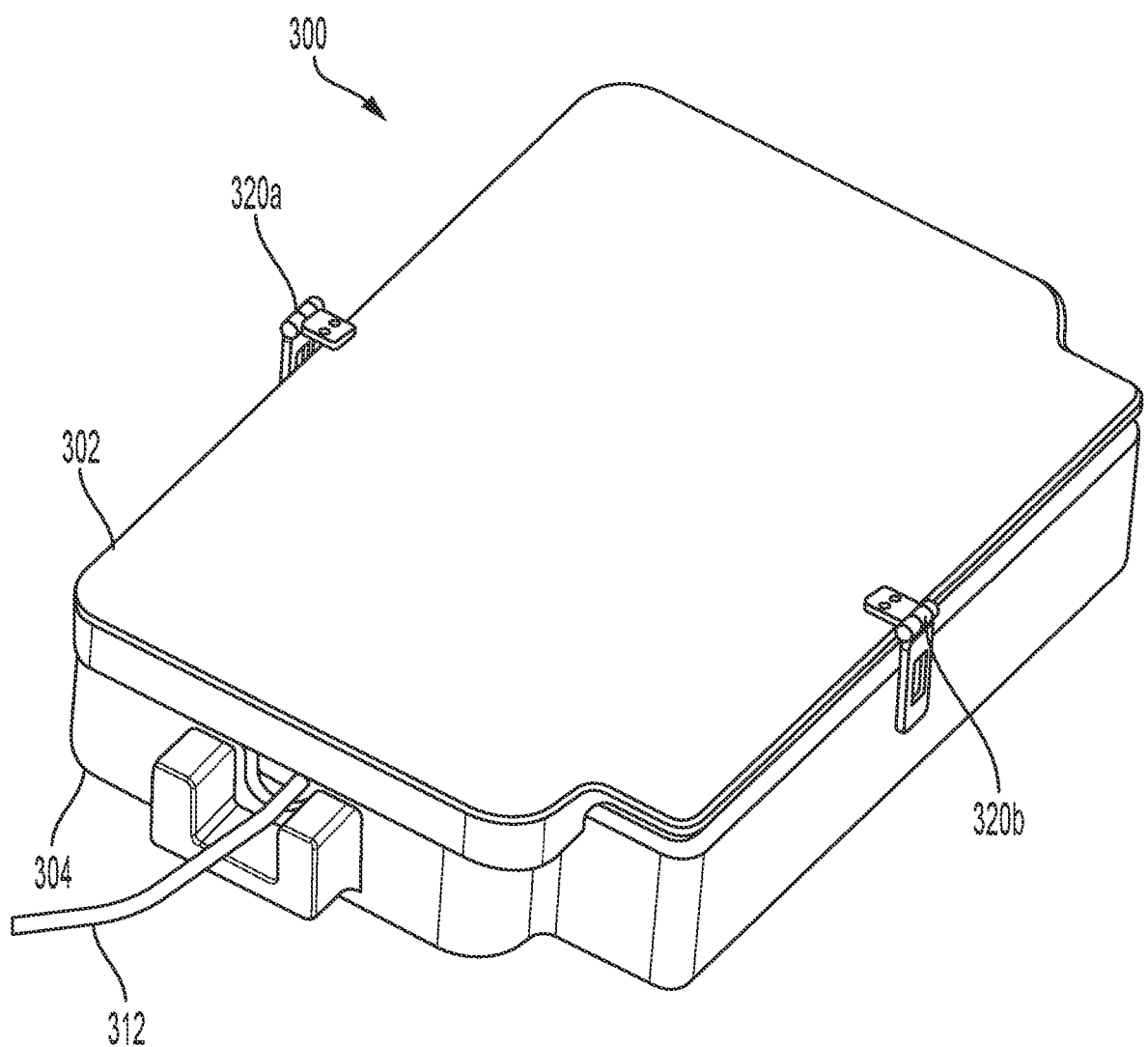

FIGS. 3A and 3B illustrate an example heater housing 300 in an open and closed position, respectively. Heater housing 300 includes a lid 302 and a compartment 304. Lid 302 may be connected to compartment 304, for example by a hinge, such that lid 302 may be closed over compartment 304. When the lid 302 is closed, heater housing 300 is thermally insulated.

The heater housing 300 includes an expandable bladder 306. In some embodiments, the expandable bladder 306 is attached to the interior of the heater housing 300, such as to the interior of lid 302. In other embodiments, expandable bladder 306 is instead fitted within a holding section in the interior of the heater housing 300 rather than being attached to the heater housing 300. Bladder 306 may be constructed of rubber, e.g., silicone rubber, or other material of suitable strength and flexibility to repeatedly expand and contract over many cycles and many treatments. In some instances, bladder 306 may be fixedly attached to the interior of lid 302, for example, by adhesive. In some instances, the bladder 306 may be fixed by fastening clamps or fasteners (e.g., when the slots are made of plates inserted into the housing). In other instances, bladder 306 may be removably attached to the interior of lid 302, for example, by hook and loop fasteners (e.g., Velcro®), snap components, hanging on hooks, or other suitable temporary attachment mechanisms. Bladder 306 may likewise include attachment flanges. Removably attaching the bladder 306 to the interior of lid 302 may enable easier maintenance of heater housing 300. For example, if bladder 306 ruptures it may easily be replaced without replacing any other components of heater housing 300.

In some embodiments, heater housing 300 may include an air pump 308 integrated with lid 302. Air pump 308 is fluidly connected to bladder 306 to inflate bladder 306 with air. Batteries or an external power supply may provide air pump 308 with necessary energy to pump air into bladder 306.

Compartment 304 is configured such that a bag or container filled with fluid may be positioned within compartment 304. For example, FIG. 3A illustrates a fluid bag or container 310 positioned within compartment 304. Fluid bag or container 310 includes a fluid outlet 312. Heater housing 300 may also include a heater (not illustrated) to heat the fluid in fluid bag or container 310. For example, the heater may be located inside compartment 304 and in an embodiment includes heating coils that contact a heating pan, which is located at the bottom of compartment 304. Heating may be resistive, inductive, infrared and combinations thereof. Compartment 304 includes an example opening 314 such that fluid outlet 312 is external to heater housing 300 when heater housing 300 is closed with fluid bag or container 310 positioned inside. The opening 314 may have a clamp or valve attached to control fluid movement, as described above. In various embodiments, compartment 304 may include a storage area 316. Storage area 316 is an empty space for placing various items. For example, a disposable set (e.g., the disposable set 106) and/or clamps or valves may be stored in the storage area 316 between dialysis sessions or during a dialysis session. In embodiments in which clamps or valves are integrated with the PD machine or cycler 104, as described above, the clamps or valves may be integrated with heater housing 300 in storage area 316. Lid 302 may also include an extension 318 configured to cover storage area 316 when lid 302 is in a closed position.

FIG. 3B illustrates example heater housing 300 in a closed configuration with fluid bag or container 310 positioned inside. Lid 302 is illustrated in a closed position over compartment 304 and fluid outlet 312 is shown external to heater housing 300. Heater housing 300 additionally includes a mechanism to maintain lid 302 in a closed position relative to compartment 304. For instance, as bladder 306 is inflated with air and expands, it will push lid 302 open unless lid 302 is maintained in the closed position. Bladder 306 may also not apply sufficient compressive force to fluid bag or container 310 to drive fluid out of fluid bag or container 310 if lid 302 were to open as bladder 306 expands (e.g., see FIGS. 4A and 4B). In various embodiments, heater housing 300 includes holding clamps 320a and 320b. Holding clamps 320a and 320 may be attached to an outer surface of compartment 304 and may be adjusted so that the clamps 320a and 320b are located to maintain lid 302 in a closed position against the force applied to lid 302 by the expanding bladder 310. Holding clamps 320a and 320b may also be adjusted so that lid 302 may be opened.

In other embodiments, heater housing 300 may include other suitable mechanisms for maintaining lid 302 in a closed positioned, such as a snap mechanism in which lid 302 or compartment 304 includes a notch and the other includes a protrusion.

FIGS. 4A and 4B illustrate a cross-sectional side view of an example heater housing 400 in a closed configuration to show the heater housing fluid-driving mechanism. Heater housing 400 includes a lid 402, a compartment 404 and a bladder 406. A fluid bag or container 408 filled with dialysis fluid is positioned within compartment 404. Fluid bag or container 408 includes a fluid outlet 410. FIG. 4A illustrates bladder 406 in a deflated condition and fluid bag or container 408 in a full state. Bladder 406 may then be inflated with air in a controlled manner, causing bladder 406 to expand away from lid 402 in the direction of arrow 412. FIG. 4B illustrates bladder 406 in a partially inflated condition and fluid bag or container 408 in a partially emptied state. As bladder 406 is inflated with air and expands, bladder 406 and compartment 404 apply compressive force to fluid bag or container 408, which drives fluid out of fluid bag or container 408 through fluid outlet 410 in the direction of arrow 414. Bladder 406 may be inflated with air until all or most of the fluid is driven out of fluid bag or container 408. The rate at which fluid exits fluid bag or container 408 is dependent upon the rate at which air is introduced into bladder 406. For instance, the greater the air flow rate into bladder 406, the faster bladder 406 expands, and the faster the generated compressive force drives the fluid out of fluid bag or container 408.

Referring again to FIG. 1, as discussed above, PD machine or cycler 104 of PD system 100 may include a control unit 190 programmed to control one or more air pump 140, pump 174 and clamps or valves 172a, 172b, 172c, 172d, 172e, 172f to direct fluid flow in PD system 100. For instance, control unit 190 is programmed to control fluid flow between respective supply bags 112a, 112b and heater bag 124, between heater bag 124 and patient 102, and between patient 102 and drain bag 130. While the fresh dialysis fluid is premade and bagged in the illustrated embodiment, control unit 190 may alternatively be programmed to prepare fresh dialysis solution at the point of use, allow it to mix, e.g., within an accumulator bag or heater bag 124, push the freshly prepared dialysis fluid from the accumulator bag or heater bag 124 to patient 102, allow the dialysis fluid to dwell within patient 102, then pull used dialysis fluid or effluent from the patient and push it to drain bag 130. Control unit 190 is also programmed to control the heater of heater housing 120.

In one example, control unit 190 is programmed to execute the following sequence assuming that each respective clamp or valve in PD system 100 begins in an open state. For instance, the sequence may begin upon a user initiating the sequence from the user interface of the PD machine or cycler 104. Throughout this example, clamps or valves 172a, 172b, 172c, 172d, 172e, 172f are electrically actuated pneumatic solenoid valves.

In the example, valves 172a, 172b, 172c and 172f are first closed, while valves 172d and 172e are left open. Pump 174 is then activated to start a drain cycle. Because valves 172a, 172b, 172c and 172f are closed while valves 172d and 172e are open, pump 174 pulls spent dialysis fluid from patient 102 to drain bag 130. Once the drain cycle is complete, valves 172d and 172e are closed. Filled drain bag 130 is replaced with an empty drain bag 130. Valve 172a and valve 172c are then opened to enable a fluid pathway from fluid supply bag 112a to heater bag 124. One or more air pump 140 is then activated to inflate bladder 114a in a controlled manner. Inflating bladder 114a drives dialysis fluid out of fluid supply bag 112a, through supply lines 150a and 152, through supply connecting tube 176a, organizing manifold 180 and heater connecting tube 176c, through heater line 156, and into heater bag 124. The rate at which bladder 114a is inflated contributes to the flow rate of the dialysis fluid through the fluid lines. After all or most of the dialysis fluid is transferred from fluid supply bag 112a to heater bag 124, the heater of heater housing 120 is activated. Valve 172a may also be closed. In certain embodiments, dialysis fluid from fluid supply bag 112a may be transferred to heater bag 124 and heated simultaneously with the directly preceding drain cycle.

Once the dialysis fluid in heater bag 124 is sufficiently heated, a patient fill cycle begins. One or more air pump 140 is activated to inflate bladder 122 in a controlled manner. Inflating bladder 122 drives heated dialysis fluid out of heater bag 124, through supply line 156, through supply connecting tube 176c and organizing manifold 180, through patient line 158, and into the peritoneal cavity of patient 102. The rate at which bladder 122 is inflated contributes to the flow rate of the dialysis fluid through the fluid lines and into patient 102. After a sufficient dwell time, a drain cycle is conducted. Valve 172c may be closed. Valve 172d may be opened, enabling a fluid pathway from patient 102 to drain bag 130. Pump 174 is then activated to start a drain cycle. Because valves 172a, 172b, 172c and 172f are closed while valves 172d and 172e are open, pump 174 will pull spent dialysis fluid from patient 102 to drain bag 130. Once the drain cycle is complete, valves 172d and 172e are closed.

Valve 172f and valve 172c are then opened to enable a fluid pathway from fluid supply bag 112b to heater bag 124. One or more air pump 140 is then activated to inflate bladder 114b in a controlled manner. Inflating bladder 114b drives dialysis fluid out of fluid supply bag 112b, through supply lines 150b and 152, through supply connecting tube 176a, organizing manifold 180 and heater connecting tube 176c, through heater line 156, and into heater bag 124. The rate at which bladder 114b is inflated contributes to the flow rate of the dialysis fluid through the fluid lines. After all or most of the dialysis fluid is transferred from fluid supply bag 112b to heater bag 124, the heater of heater housing 120 is energized. Valve 172c may also be closed. In certain embodiments, dialysis fluid from fluid supply bag 112b may be transferred to heater bag 124 and heated simultaneously with the directly preceding drain cycle.

Once the dialysis fluid in heater bag 124 is sufficiently heated, a patient fill cycle begins. One or more air pump 140 is activated to inflate bladder 122 in a controlled manner. Inflating bladder 122 drives heated dialysis fluid out of heater bag 124, through supply line 156, through supply connecting tube 176c and organizing manifold 180, through patient line 158, and into the peritoneal cavity of patient 102. The rate at which bladder 122 is inflated contributes to the flow rate of the dialysis fluid through the fluid lines and into patient 102. After a sufficient dwell time, valve 172c may then be closed. Valve 172d may then be opened, enabling a fluid pathway from patient 102 to drain bag 130. Pump 174 is then activated to start a drain cycle. Because valves 172a, 172b and 172c are closed while valve 172d is open, pump 174 pulls spent dialysis fluid from patient 102 to drain bag 130. Once the drain cycle is complete, valve 172d is closed.

Valve 172b and valve 172c are then opened to enable a fluid pathway from fluid supply bag 112c (e.g., a last fill bag) to heater bag 124. One or more air pump 140 is then activated to inflate bladder 114c in a controlled manner. Inflating bladder 114c drives dialysis fluid out of fluid supply bag 112c, through supply line 154, through supply connecting tube 176b, organizing manifold 180 and heater connecting tube 176c, through heater line 156, and into heater bag 124. The rate at which bladder 114c is inflated contributes to the flow rate of the dialysis fluid through the fluid lines. After all or most of the dialysis fluid is transferred from fluid supply bag 112c to heater bag 124, the heater of heater housing 120 is energized. Valve 172b may also then be closed. In certain embodiments, dialysis fluid from fluid supply bag 112c may be transferred to heater bag 124 and heated simultaneously with the directly preceding drain cycle.

Once the dialysis fluid in heater bag 124 is sufficiently heated, one or more air pump 140 is activated to inflate bladder 122 in a controlled manner. Inflating bladder 122 drives heated dialysis fluid out of heater bag 124, through supply line 156, through supply connecting tube 176c and organizing manifold 180, through patient line 158, and into the peritoneal cavity of patient 102.

One having skill in the art will appreciate that control unit 190 may be programmed with many other sequences of performing the above-described drain, fill and dwell patient cycles for dialysis treatment. For example, heater bag 124 may begin in a full state so that the heated dialysis fluid in heater bag 124 may be directed to patient 102 after the first drain cycle without the need to fill heater bag 124 with dialysis fluid from a fluid supply bag. In another example, PD system 100 may only include one fluid supply bag and one last-fill bag, instead of two fluid supply bags. Additionally, the order of some of the actions in the example sequences described herein may be changed, certain actions may be executed simultaneously, one or more of the actions may be repeated, and some of the actions described may be optional.

Figure 5A:
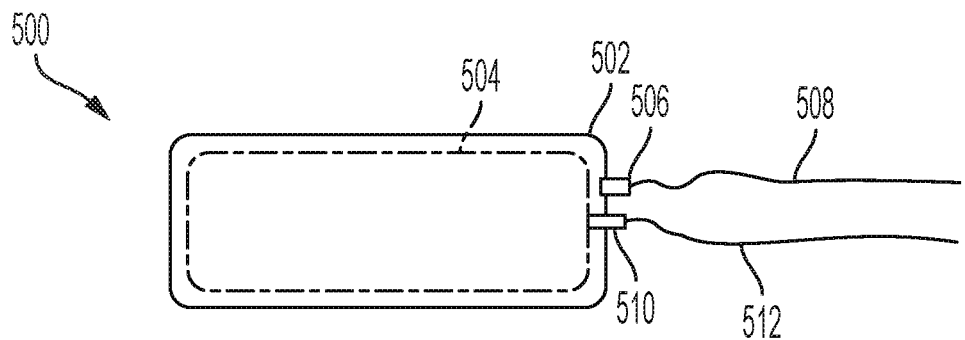
FIGS. 5A to 5C illustrate schematics of the components of a drain bag that is particularly constructed to aid in driving fluid from a patient to the drain bag 130 via air from an air pump, according to an aspect of the present disclosure.
Figure 5B:
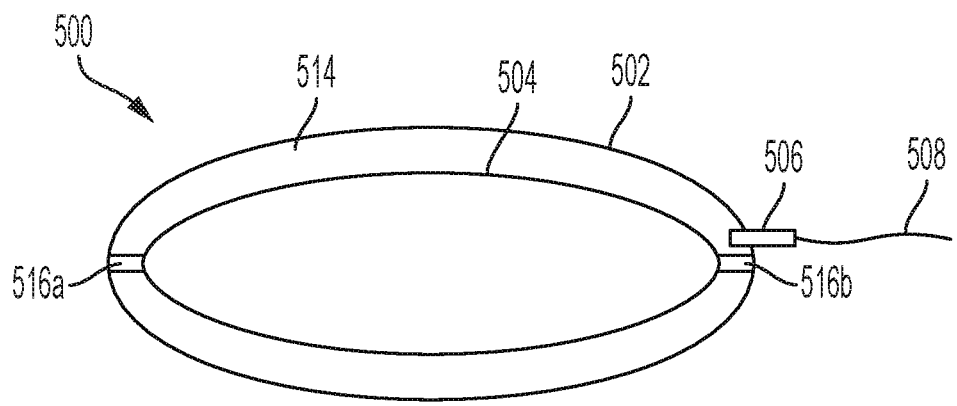
Figure 5C:
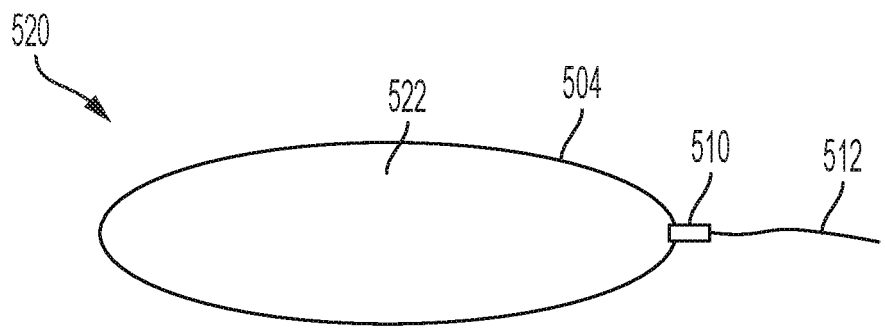

In some aspects of the present disclosure, drain bag 130 is particularly constructed to aid in driving fluid from patient 102 to drain bag 130 via air from one or more air pump 140. For example, FIGS. 5A to 5C illustrate the components of an air-driven drain bag 500 that is particularly constructed as such. In such aspects, one or more air pump 140 of PD machine or cycler 104 is pneumatically connected so as to selectively supply air in a controlled manner to air-driven drain bag 500 in addition to any one or more or each of bladder 114a, 114b, 114c and/or bladder 122 in any of the manners described above (e.g., a single air pump with pneumatic tubes and clamps/valves, or multiple air pumps). Additionally, in such aspects, pump 174 (e.g., a peristaltic, membrane or gear pump) may remain in operable communication with drain line 160 to aid air-driven drain bag 500 in pulling used dialysis fluid of effluent from patient 102. In other instances, pump 174 may be removed.

FIG. 5A illustrates a schematic top view of the example air-driven drain bag 500 in a deflated state. Air-driven drain bag 500 includes an outer component and an inner component. The outer component includes an outer bag 502 in fluid communication with a pneumatic port 506 that is in fluid communication with a pneumatic line 508. An airtight seal connects outer bag 502 and pneumatic port 506. Pneumatic line 508 is in fluid communication with one or more air pump 140. The inner component includes an inner bag 504 in fluid communication with a fluid port 510 that is in fluid communication with a fluid line 512 (e.g., drain line 160). An airtight seal connects inner bag 504 and fluid port 510 and another airtight seal connects outer bag 502 and fluid port 510. FIG. 5B illustrates a schematic cross-section of drain bag 500 in a partially or fully expanded condition.

Outer bag 502 is joined (e.g., fused) with inner bag 504 at multiple joining points 516a, 516b. In should be appreciated that the multiple joining points 516a, 516b may be at any position around the perimeter of inner bag 504. In at least one example, outer bag 502 is ultrasonically welded or solvent bonded to inner bag 504 at the multiple joining points 516a, 516b. As air is supplied to drain bag 500 through pneumatic line 508, the air fills an interior 514 of outer bag 502. As illustrated, interior 514 of outer bag 502 is exterior to inner bag 504 due to the airtight seal at the interface of fluid port 510 and inner bag 504 that does not allow air to enter inner bag 504.

FIG. 5C illustrates an interior component 520 of air-driven drain bag 500. Interior component 520 includes inner bag 504 in fluid communication with fluid port 510 that is in fluid communication with fluid line 512. An interior 522 of inner bag 504 is initially empty, though fills with fluid via fluid line 512 as dialysis fluid is pulled from patient 102.

Figure 6A:
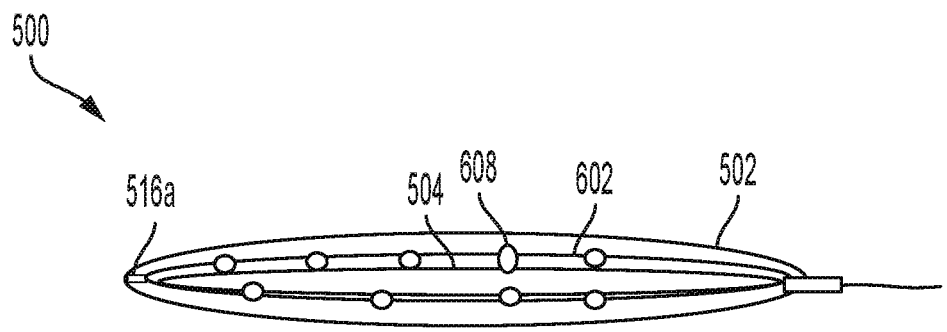
FIGS. 6A and 6B illustrate cross-sectional schematics of an air-powered drain bag to show the air driving mechanism driving fluid into the drain bag, according to an aspect of the present disclosure.
Figure 6B:
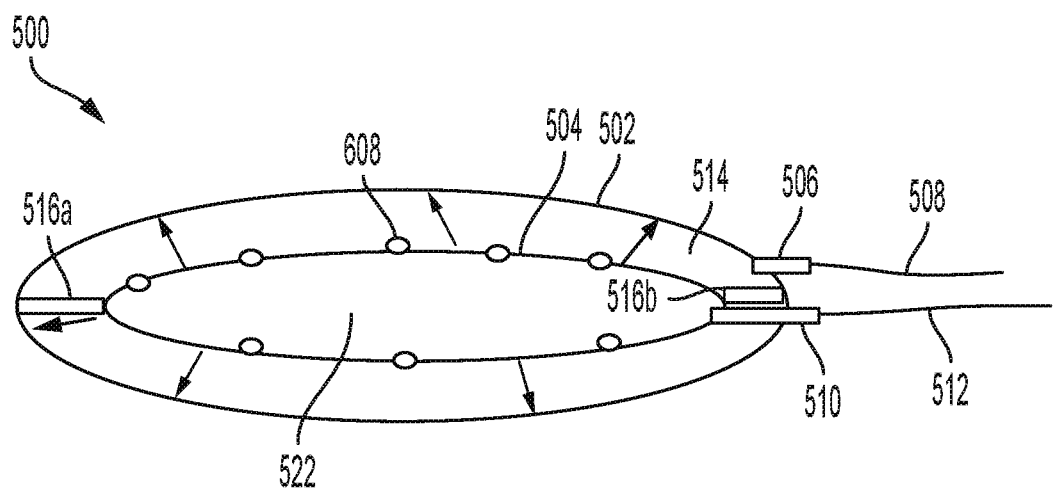

FIGS. 6A and 6B illustrate cross-sectional schematics of air-driven drain bag 500 to show the air driving mechanism driving fluid into air-driven drain bag 500. FIG. 6A illustrates air-driven drain bag 500 in a deflated condition. For illustrative purposes, multiple joining points 608 are shown joining (e.g., fusing) inner bag 504 to inner material 602 of outer bag 502. It should be appreciated that only one joining point 608 is indicated in FIGS. 6A and 6B for clarity purposes. It should also be appreciated that the multiple joining points 608 may be at any position and take any shape around the exterior of inner bag 504. In at least one example, outer bag 502 is ultrasonically welded or solvent bonded to inner bag 504 at the multiple joining points 608. In one example, inner bag 504 may be fully joined to inner material 602 of outer bag 502, rather than at multiple discrete points. In another example, inner bag 504 and outer bag 502 may be constructed as a single component rather than being joined.

Because of this construction of joining points 608, as outer bag 502 expands (e.g., fills with air), outer bag 502 pulls inner bag 504 open. Outer bag 502 may be constructed such that it transitions to a round shape after inflation. This is shown in FIG. 6B that illustrates air-driven drain bag 500 in a partially or fully expanded condition. As air enters interior 514 of outer bag 502 via pneumatic line 508, outer bag 502 expands outward in the direction of the illustrated arrows. Outer bag 502 expanding causes inner bag 504 to expand, which creates a vacuum force that pulls fluid into interior 522 of inner bag 504 via fluid line 512. The vacuum force is created because inner bag 504 is initially flat and devoid of any fluid, so as inner bag 504 is expanded, the volume created within inner bag 504 must be filled.

As described above, control unit 190 may be programmed to control the various components of PD system 100 to direct fluid flow. In instances in which PD system 100 includes air-driven drain bag 500, control unit 190 may be programmed to activate one or more air pump 140 to deliver air to air-driven drain bag 500 during a drain cycle. In some instances, this may require control unit 190 to control the opening and closing of various valves or clamps so that air is delivered to air-driven drain bag 500.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A peritoneal dialysis system comprising:
 a cycler including
  one or more air pump;
  a slotted housing including a plurality of slots each having a first side and a second side, wherein each respective slot of the plurality of slots includes a first expandable bladder fixed to the first side, and wherein each respective slot of the plurality of slots is configured to receive a fluid supply bag between the first expandable bladder and the second side, and
  a heater housing sized to hold a second expandable bladder, and wherein the heater housing is configured to receive a fluid heater bag adjacent to the second expandable bladder,
  wherein the one or more air pump is in fluid communication with the respective first expandable bladders and the second expandable bladder; and
 a disposable set operable with the cycler.

2. The peritoneal dialysis system of claim 1, which is configured such that each respective first expandable bladder, and the second expandable bladder, is inflatable with air from the one or more air pump independently of the other bladders.

3. The peritoneal dialysis system of claim 1, which is configured such that inflating a respective first expandable bladder in a respective slot with air drives fluid out of a respective fluid supply bag positioned in the respective slot.

4. The peritoneal dialysis system of claim 1, which is configured such that inflating the second expandable bladder with air drives fluid out of the fluid heater bag positioned in a compartment of the heater housing.

5. The peritoneal dialysis system of claim 1, wherein the one or more air pump is provided with at least one of the slotted housing or the heater housing.

6. The peritoneal dialysis system of claim 1, wherein a rate of fluid flow from each of the fluid supply bags is dependent on a rate of air flow from the one or more air pump.

7. The peritoneal dialysis system of claim 1, wherein the disposable set includes:
 the fluid supply bags,
 the fluid heater bag,
 a drain bag,
 a respective supply line fluidly connected to each respective fluid supply bag,
 a heater line fluidly connected to the fluid heater bag, and
 a drain line fluidly connected to the drain bag.

8. The peritoneal dialysis system of claim 7, wherein the drain bag includes:
 an outer bag in fluid communication with the one or more air pump; and
 an inner bag in fluid communication with the drain line, the inner bag positioned within the outer bag,
 wherein the outer bag is connected to the inner bag such that expansion of the outer bag causes expansion of the inner bag.

9. The peritoneal dialysis system of claim 7, which includes a drain pump positioned and arranged to pump used dialysis fluid to the drain bag.

10. The peritoneal dialysis system of claim 7, wherein the cycler further includes at least one valve, and wherein at least one of the supply line, heater line or drain line is selectively occluded by the at least one valve.

11. The peritoneal dialysis system of claim 1, wherein the slotted housing and the heater housing are provided in a same enclosure.

12. A peritoneal dialysis system comprising:
a cycler including
one or more air pump,
a slotted housing including a plurality of slots each having a first side and a second side, wherein each respective slot of the plurality of slots includes a first expandable bladder fixed to the first side, and wherein each respective slot of the plurality of slots is configured to receive a fluid supply bag between the first expandable bladder the second side,
a heater housing sized to hold a second expandable bladder, and wherein the heater housing is configured to receive a fluid heater bag adjacent to the second expandable bladder, and
at least one valve,
wherein the one or more air pump is in fluid communication with the respective first expandable bladders and the second expandable bladder; and
a disposable set operable with the cycler, the disposable set including
the fluid supply bags positioned in the slots,
the fluid heater bag positioned in a compartment of the heater housing,
a drain bag,
a supply line fluidly connected to each respective fluid supply bag,
a heater line fluidly connected to the fluid heater bag,
a drain line fluidly connected to the drain bag, and
a patient line,
wherein at least one of the supply lines, the heater line or the drain line is selectively occluded via the at least one valve.

13. The peritoneal dialysis system of claim 12, wherein the cycler further includes a drain line pump configured to pump used dialysis fluid to flow to the drain bag; and
a control unit programmed to cause:
supply line and heater line valves to close,
the drain line pump to be actuated,
a drain line valve to close,
a first supply line valve for a first fluid supply bag positioned in a first slot to open,
a heater line valve to open,
the one or more air pump to be actuated to inflate the first expandable bladder positioned in the first slot,
the first supply line valve to close, and
the one or more air pump to be actuated to inflate the second expandable bladder.

14. The peritoneal dialysis system of claim 13, wherein the drain bag includes:

an outer bag in fluid communication with the one or more air pump; and
an inner bag in fluid communication with the drain line, the inner bag positioned within the outer bag,
wherein the outer bag is connected to the inner bag such that expansion of the outer bag causes expansion of the inner bag, and
the control unit is further programmed to cause, prior to causing the drain line valve to close, the one or more air pump to be actuated to inflate the outer bag.

15. The peritoneal dialysis system of claim 13, wherein the control unit is further programmed to cause:
the heater line valve to close;
the drain line valve to open;
the drain line pump to be actuated;
the drain line valve to close;
a second supply line valve for a second fluid supply bag positioned in a second slot to open;
the heater line valve to open;
the one or more air pump to be actuated to inflate the first expandable bladder positioned in the second slot;
the second supply line valve to close; and
the one or more air pump to be actuated to inflate the second expandable bladder.

16. A peritoneal dialysis cycler comprising:
one or more air pump;
a slotted housing including a plurality of slots each having a first side and a second side, wherein each respective slot of the plurality of slots includes a first expandable bladder fixed to the first side, and wherein each respective slot of the plurality of slots is configured to receive a fluid supply bag between the first expandable bladder and the second side; and
a heater housing including a compartment sized to hold a second expandable bladder, wherein the heater housing is configured to receive a fluid heater bag adjacent to the second expandable bladder, and
wherein the one or more air pump is in fluid communication with the respective first expandable bladders and the second expandable bladder.

17. The peritoneal dialysis cycler of claim 16, wherein the slotted housing is configured such that each first expandable bladder may inflate to contact the second side of its respective slot.

18. The peritoneal dialysis cycler of claim 16, wherein the heater housing includes a heater to supply heat to fluid in the fluid heater bag positioned within the compartment.

19. The peritoneal dialysis cycler of claim 16, wherein the slotted housing and the heater housing are provided in a same enclosure.

20. The peritoneal dialysis cycler of claim 16, wherein the heater housing is thermally insulated.

* * * * *